Dec. 17, 1963  J. A. BORIS  3,114,448
VIBRATORY PARTS FEEDING DEVICE
Filed Feb. 24, 1961  2 Sheets-Sheet 1

INVENTOR
John A. Boris
BY
Pennie, Edmonds, Morton, Barrows & Taylor
ATTORNEYS

Dec. 17, 1963 J. A. BORIS 3,114,448
VIBRATORY PARTS FEEDING DEVICE
Filed Feb. 24, 1961 2 Sheets-Sheet 2
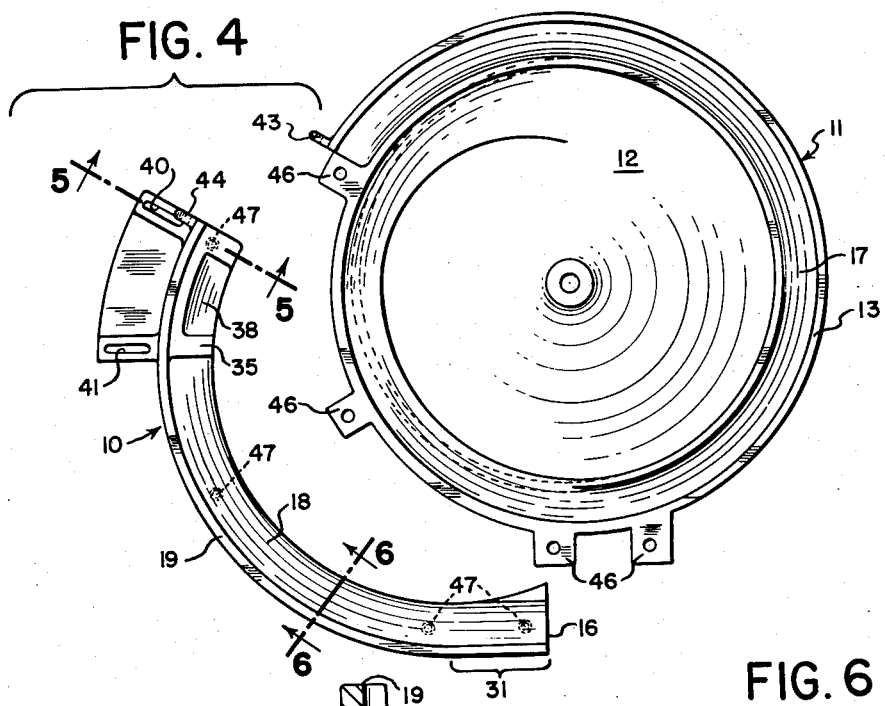
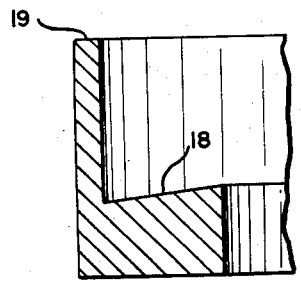
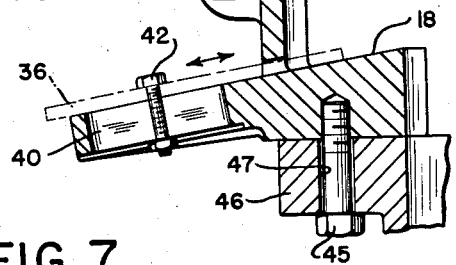
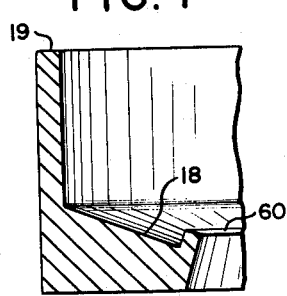
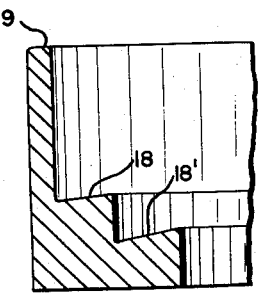
INVENTOR
John A. Boris
BY
Pennie, Edmonds, Morton, Barrows & Taylor
ATTORNEYS

United States Patent Office 3,114,448
Patented Dec. 17, 1963

3,114,448
VIBRATORY PARTS FEEDING DEVICE
John A. Boris, Adelphi, Md., assignor to U.S. Industries, Inc., New York, N.Y., a corporation of Delaware
Filed Feb. 24, 1961, Ser. No. 91,523
4 Claims. (Cl. 198—33)

The present invention relates to article handling devices and more particularly to hopper bowls for vibratory type feeders which are adapted to serially deliver articles up an inclined spiral shelf-track to a receiving station with each article being delivered in a predetermined oriented position.

A variety of vibratory type parts feeding devices have been proposed in the prior art for delivering specifically shaped articles in predetermined oriented positions to receiving stations on automatic assembly production lines and the like. Such known parts feeders ordinarily include a hopper bowl which is mounted on a compliant support operatively associated with an electromagnetic vibratory motor which is adapted to reciprocally vibrate the article loaded hopper at a repetition rate corresponding to the natural mechanical resonant frequency of the assembly. A continuous spiral shaped shelf-track is provided along the inner wall surface of the hopper to convey articles from the bottom floor upwardly along the shelf-track to an output discharge station disposed near the upper peripheral edge of the hopper. Depending upon the shape of the articles to be oriented and delivered by the feeder device, the shelf-track may be slotted, altered in width or slope or general contour, and co-operating wiper-blade or profile elements may be mounted adjacent the conveyor track to effect the desired orientation of parts.

In the proposed prior art devices, it has been customary practice to permanently incorporate the required orienting fixtures and track features into the hopper bowl to be used for delivery of a specific article. This practice has several significant disadvantages. Since the alterations are normally of a permanent nature, once they have been made, use of the hopper bowl is substantially limited to a single parts feeding application. Thus the user is required to stock a separate complete hopper bowl for each application and the complete hopper must be changed with each change of application. This procedure is time consuming and the inventory requirements are expensive. The limited hopper bowl versatility also forces the manufacturer or fabricator to maintain a large and expensive inventory. Additionally, the machining operations required to incorporate the orienting features into the hopper are difficult, time consuming and expensive. This is due to the fact that the hopper bowls are relatively large (typically 18" to 30" in diameter) and difficult to mount and handle in milling, grinding and lathe operations. Setup times and machining times are long and skilled machinists are required to perform the work. Furthermore, machining errors often result in irreparable damage to the hoppers and consequent expensive scrapping of the entire bowls.

With the present known systems, the weights of the hopper bowls of a given diameter vary appreciably between species depending upon the track widths, orienting features employed, etc. The weight differentials change the mechanical resonant frequency of the vibratory driver assembly so that the drive system must be retuned with each bowl change in order to obtain satisfactory feeder operation. This operational procedure is time consuming and expensive requiring the addition of weights or more likely a change of suspension springs.

It is a principal object of the present invention to provide an improved plural section or segmented hopper bowl for a vibratory parts feeder which overcomes the aforementioned disadvantages of prior art devices.

In accordance with the teachings of the present invention, an improved feeder hopper is provided which comprises two separable sections or segments. The first section comprises the main base bowl section of the hopper bowl including the bottom floor and the major portion of the hopper side wall and spiral helix shelf-track, and the second section comprises an upper minor segment of the hopper side wall including the terminal minor segment of the spiral helix shelf-track. The minor wall and shelf-track segment is provided to support and otherwise accommodate all orienting features and fixtures for the hopper bowl. Provisions are made for detachably securing the two segments together to form an integral hopper bowl. Hereinafter the two segments will be identified as the orienting section and the base bowl section.

In manufacturing the segmented hopper bowl provided by the present invention, the two sections are advantageously fabricated separately (i.e., from castings or sheet metal), and the necessary welding or machining operations required to add appropriate orienting fixtures are completed on the relatively small orienting section. Since the orienting section is smaller, less massive and more accessible for machining, the machining operations are greatly simplified and manufacturing costs are proportionately reduced. Furthermore, machining errors result only in the scrapping of a relatively small and inexpensive segment instead of an entire hopper bowl. Since all the variations in track widths, shapes, etc. are incorporated into the small orienting section, the manufacturer need only stock one style or specie of a given diameter base bowl along with the different styles or species of small orienting sections. Thus both the manufacturer's inventory and the cost of production are substantially reduced.

The apparatus provided by the present invention also features several noteworthy operational advantages. Since the orienting fixtures are always incorporated in the small orienting section, the bottom portion of the hopper bowl may be employed as a standard or universal section which may remain affixed to a standard base having the proper compliant support and vibratory drive motor. The user need only stock a variety of small relatively inexpensive orienting sections for the specific parts to be handled instead of a variety of complete bowls, and the vibratory feeder may be rapidly converted to function in various parts feeder applications by simply interchanging the orienting segments as required. The main base bowl section is thereby made just as versatile as the vibratory motor base and controller system.

A further advantage afforded by the present invention lies in the fact that the total hopper mass and hopper mass distribution (about the vertical central axis) is held substantially constant (for a given bowl diameter) by making the base bowls standard and all of the same weight and by maintaining tolerance limits on weight differentials for the interchangeable orienting sections. Compensation is readily tailored into each orienting section (e.g., during casting) to accommodate mass changes produced by the addition of orienting elements or by the machining operations. Thus the mechanical resonant frequency of the final hopper assembly is maintained substantially constant and independent of changes of the orienting sections. Consequently, optimum and uniform vibratory drive efficiency (at resonant frequency) is maintained independent of changes in orienting segments and without the need for returning the driver assembly.

Other objects and advantages of the invention will be pointed out in the following description and claims and illustrated in the accompanying drawings which show a preferred embodiment of the invention. In the drawings:

FIG. 4 is a plan view of the segmented hopper provided by the invention with the sections separated;

FIGS. 5 and 6 are enlarged sectional views of FIG. 4 as indicated;

FIG. 7 is an enlarged sectional view of an inwardly sloping orienting track, including an inside track wall; and FIG. 8 is an enlarged sectional view of an orienting section having inwardly sloping dual tracks.

Figure 1:
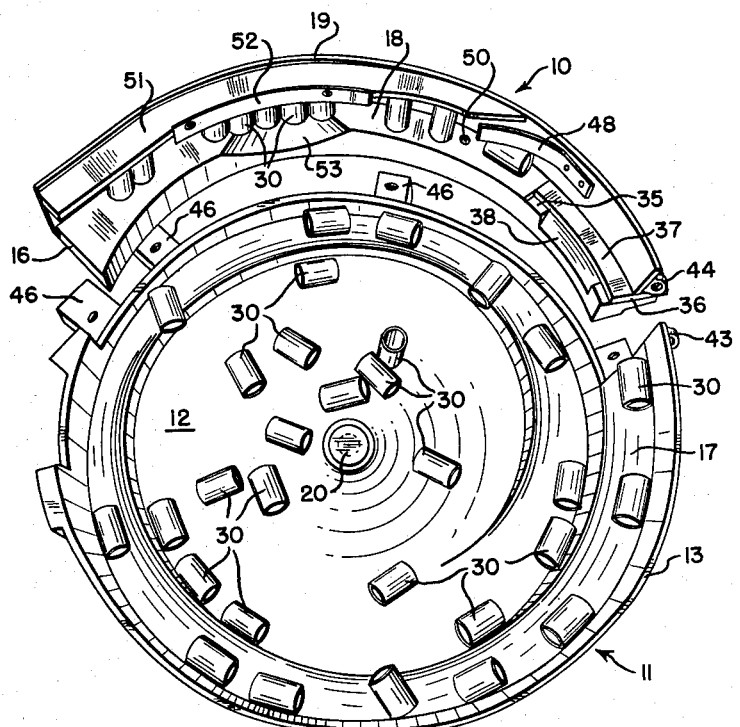
FIG. 1 is a perspective plan view of a segmented hopper bowl provided by the invention with the sections separated.

The segmented hopper bowl provided by the present invention as shown in FIGS. 1 and 4 comprises an orienting section 10 and an article receiving base bowl 11. The two sections, shown separated for purposes of explanatory simplification, are adapted to be bolted or otherwise co-operatively secured together to form an integral hopper bowl for a vibratory type parts feeder. In the preferred embodiment of the invention, the two segments are separately cast from a relatively light-weight metal such as an aluminum alloy which has good machining qualities. The base bowl includes an outwardly sloping (conical) bottom floor 12 and the major lower segment of the upright annular hopper wall 13. The complete hopper has a continuous spiral helix shelf-track which originates at the bottom floor and terminates at the article discharge track end 16. The lower major track segment 17 is defined by the inner surface of wall 13 and the terminal minor track segment 18 is defined by the minor wall segment 19 which forms part of the orienting section 10.

The base bowl 11 is secured by bolt 20 to a plate in driver base 21 which houses a compliant support and a conventional electro-mechanical vibratory drive motor. The apparatus and vibratory action which induces movement of the articles up the inclined spiral track is known in the art and will not be described herein. Suitable vibratory driver apparatus is described in U.S. Patent 2,609,914 to Balsiger et al.

Figure 2:
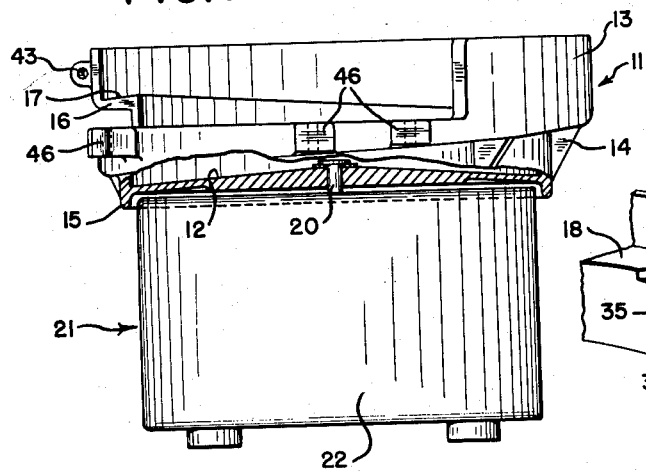
FIG. 2 is an elevation view showing the main base bowl section mounted on a vibratory motor base assembly.

The surface of track 17 is advantageously sloped downwardly towards the outside wall (see FIG. 2) so that articles conveyed up the track by vibratory reciprocation of the hopper will not tend to fall from the track and be returned to the bottom floor. The generally upright annular wall 13 is advantageously step-tapered as shown to accommodate the helix step-track which spirals progressively outwardly as an Archimedes spiral in advancing towards 16. This structural arrangement is advantageous in that the total bowl mass is maintained at a minimum and the hopper load handling capability is accordingly increased. It will be appreciated, however, that cylindrical side walls may be employed where desired. Webs 14 provide added stiffening support for the wall and track. Lip 15, provided around the lower periphery of the base bowl, functions as a shield to prevent parts from falling into the vibratory drive mechanism mounted inside housing 22.

Section 10 in FIG. 1 exemplifies a typical combination of orienting fixtures and track modifications that may be incorporated into a single orienting section to achieve the desired orientation of delivered articles. The various orienting elements and track features function co-operatively to effect complete orientation of the hollow cylindrical articles 30 which are advanced from track 17 onto and across track 18 for delivery to a receiving station located adjacent to 16. The curvature of the entire hopper shelf-track is that of an Archimedes spiral, however, the last few inches of the track are straightened as shown at 31 in FIG. 4 and this straight section serves as the article discharge end to which rails, chutes, storage magazines or the like may be attached as receiving stations at 16.

Figure 3:
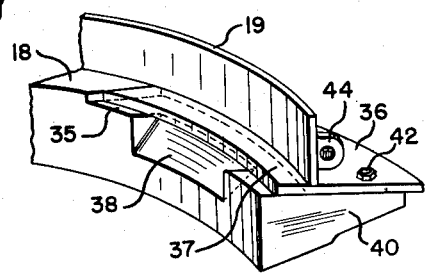
FIG. 3 is a fragmentary perspective view of an orienting section providing means for adjusting the width of an orienting shelf-track.

Means are provided at the beginning of track 18 for adjusting the effective width of the track. This feature enhances the versatility of the hopper bowl by making it possible to employ a relatively wide track in the base bowl section which can accommodate articles having a wide range of sizes. A portion of the track is cut away to a lower level 35 and the curved wall 19 is undercut as shown to permit access by plate 36 to the track area from outside the wall (see FIG. 3). The upper surface 37 of plate 36 is flush with track surface 18 and the plate effectively bridges that portion of the track which is removed to provide a sloping surface 38. The track width is simply varied by moving the plate in or out to provide the desired track width. The plate 36 is supported on a pair of slotted gussets 40 and 41 and is securely clamped at the desired position by a pair of bolts 42 (see FIGS. 4 and 5). The entire orienting segment is conveniently attached to the main base bowl segment by four bolts 45 which extend upwardly through mounting lugs 46 and into threaded holes 47 provided in the flat bottom portion of the orienting track segment. Bosses 43 and 44 are provided at the adjoining ends of walls 13 and 19 respectively. The hole in boss 44 is threaded and the two walls are securely butted and held together with a single bolt (not shown). When bolted together, the respective inner wall surfaces and track surfaces are smoothly and rigidly joined together to form continuous integral surfaces. Orienting sections may be rapidly attached or removed by tightening or loosening the bolts as required.

In normal operation of the hopper shown in FIG. 1, plate 36 is positioned so that cylinders 30 advancing crosswise on the track are dropped back into the bowl. Blade 48 mounted on the inner surface of wall 19 is provided to hold down the rearward portion of the advancing cylinder while the forward portion is lifted to an upright position by an air jet from track orifice 50. Upper shelf 51 and guide rail 52 maintain the cylinders in the desired upright oriented position for delivery to a receiving station located adjacent to 16. The sloping track section 53 causes those cylinders whose bases are too near the inner edge of the track to fall back into the bowl.

The plan view in FIG. 4 shows a preferred embodiment of the invention with a basic orienting section 10 and the main base bowl section 11 separated. A major portion of the spiral shelf-track is contained in the base bowl section (420°) and the terminal minor segment of the track (135°) is supported by the orienting section. The adjustable track width feature described above is advantageously incorporated into each basic orienting section. The initial weights of the basic orienting sections may be varied slightly by altering the dimensions of the casting molds so that the final weights of the fully equipped orienting sections (including wiper blades, profile elements, slotted elements, etc.) are substantially constant. The weight distribution may be maintained uniform about the arcuate section by graduating the mold dimensions for each basic orienting section as required in order to compensate for removal of material from portions of the track surface or additions of orienting fixtures. The typical weight of an equipped orienting segment for an 18-inch diameter bowl (cast aluminum alloy) is approximately two pounds and the weight of the co-operating main bowl section is approximately 11 pounds.

As indicated above, the track surface 18 may be machined in many different ways to effect position orientation of delivered parts. In certain instances it may be desirable to slope the track surface to the outside wall as shown in FIG. 6, whereas in other instances the user may find it desirable to slope the surface inwardly as shown in FIG. 7 and provide an added rail 60. The latter arrangement is particularly useful for the delivery of disc-shaped articles such as washers. Where required, the latter portion of the orienting track may be machined to provide dual track surfaces 18 and 18' (FIG. 8) which are capable of delivering articles to two separate receiving stations.

The variety of specific types of orienting fixtures and features that may be incorporated into any given orienting segment of the present invention is limited only by the ingenuity of the user. The inventor has found through exhaustive operational tests that substantially any presently known orientation specification can be incorporated into a single orientation section of the type shown and described wherein the track segment in the orienting section is approximately 135° and the base bowl track is approximately 420° (see FIG. 4).

Those skilled in the art will fully appreciate the advantages offered by the present invention in the way of reduced manufacturing and operating costs, and improved operational flexibility and versatility.

A preferred embodiment of the invention has been shown and described. Variations within the scope of the invention defined in the claims will occur to those skilled in the art.

I claim:
1. A plural section hopper bowl adapted to be reciprocally driven along a central axis of vibration on a compliant support by a vibratory motor to automatically deliver articles in position oriented sequence, said hopper having an upright annular wall and a bottom floor, the inner surface of said wall defining an article delivery helix shelf-track originating at said bottom floor and terminating at an article discharge station near the upper periphery of said hopper wall, the component sections of said hopper comprising an article receiving base bowl section including said bottom floor and a lower major segment of said hopper wall defining the major portion of said shelf-track; and a plurality of interchangeable article orienting sections each having substantially the same total weight and weight distribution and each being adapted to position-orient a differently shaped article, each of said orienting sections comprising a separable upper minor arcuate segment of said hopper wall, the inner surface of which defines the terminal minor segment of said shelf-track, with means mounted on the said minor wall segment for uniformly position-orienting a given article delivered on the shelf-track to the article discharge station, and means for detachably securing any one of said plural article orienting sections to the said base bowl section, whereby the total weight of said plural section hopper bowl and the weight distribution thereof about said central axis of vibration is maintained substantially constant with interchange of article orienting sections.

2. The plural section hopper bowl of claim 1 characterized in that the means for position-orienting delivered articles includes adjustable means for varying the effective width of at least a portion of the orienting shelf-track.

3. A segmented hopper bowl adapted to be reciprocally driven on a compliant support by a vibratory motor to automatically deliver articles in position oriented sequence, said hopper having an upright annular wall and a bottom floor, the inner surface of said wall defining an article delivery helix shelf-track originating at said bottom floor and terminating at an article discharge station near the upper periphery of said hopper wall, the component segments of said hopper comprising an article receiving base bowl section including said bottom floor and a lower major segment of said hopper wall defining the major portion of said shelf-track, and a plurality of separable and interchangeable upper minor segments of said hopper wall, each having substantially the same total weight and weight distribution, each inner surface of which defines the terminal minor segment of said helix shelf-track, orienting fixtures mounted on each minor wall segment for uniformly position-orienting a specifically shaped article delivered on the shelf-track to the article discharge station, at least one of said orienting fixtures comprising a variable width shelf-track including a recessed cut-out extending to the inner surface of the hopper wall, the wall of the minor segment defining a slot adjacent said recessed cut-out which is adapted to receive an adjustable plate for bridging and extending over a desired width of said recessed cut-out to effectively vary the width of the helix shelf-track on said minor segment, and means for detachably securing any one of said plural article orienting sections to said base bowl section, whereby the total weight of said segmented hopper bowl and the weight distribution thereof about said central axis of vibration is maintained substantially constant with interchange of different article orienting sections.

4. A segmented hopper bowl in accordance with claim 3 characterized in that the shelf-track defined by the minor segment is substantially one-third the length of the shelf-track defined by the major base bowl segment.

References Cited in the file of this patent
UNITED STATES PATENTS

| | | |
|---|---|---|
| 2,725,971 | Riede | Dec. 6, 1955 |
| 2,790,534 | Spurlin | Apr. 30, 1957 |
| 2,915,165 | Bell | Dec. 1, 1959 |
| 2,964,182 | Spurlin | Dec. 13, 1960 |